UNITED STATES PATENT OFFICE.

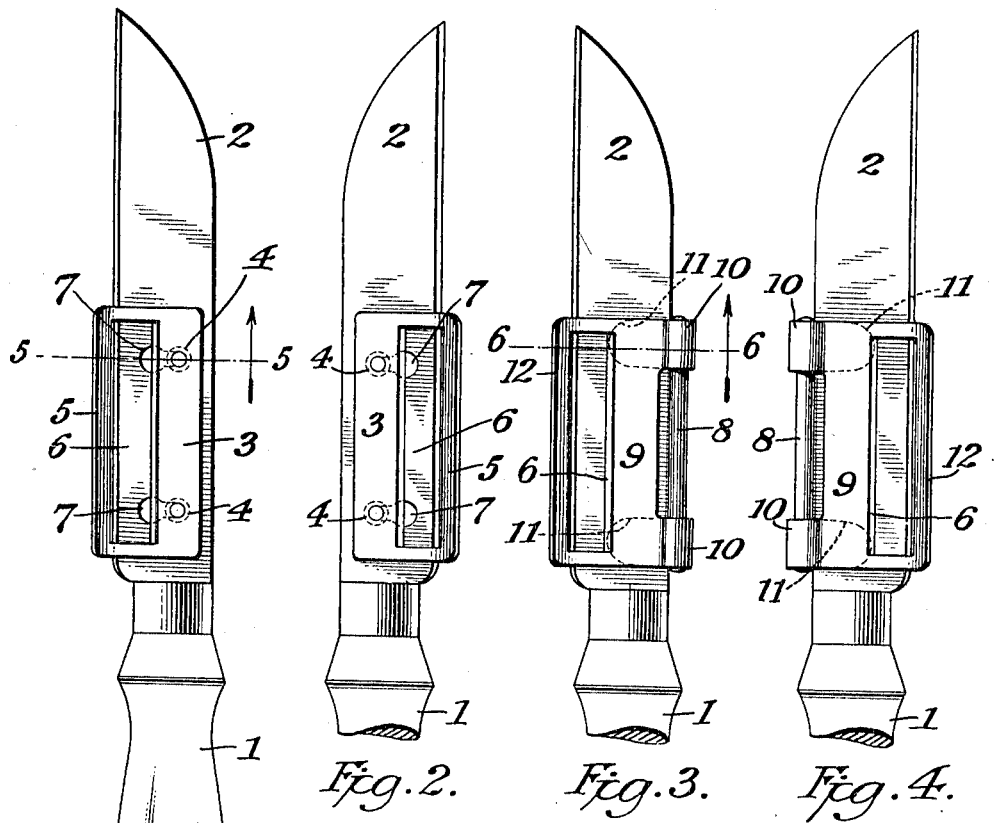
G. A. MEYER.
CULINARY KNIFE.
APPLICATION FILED SEPT. 16, 1914.
1,118,507.
Patented Nov. 24, 1914.
Fig. 1. Fig. 2. Fig. 3. Fig. 4.
Fig. 5.
Fig. 6.
Witnesses:
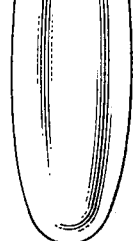
Inventor
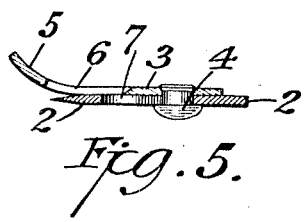
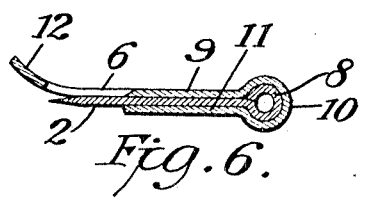

GEORGE A. MEYER, OF NEW YORK, N. Y.

CULINARY KNIFE.

1,118,507.

Specification of Letters Patent.

Patented Nov. 24, 1914.

Application filed September 16, 1914. Serial No. 861,950.

*To all whom it may concern:*

Be it known that I, GEORGE A. MEYER, a citizen of the United States, and a resident of the borough of Brooklyn, county of Kings, city and State of New York, have invented a new and useful Improvement in Culinary Knives, of which the following is a specification.

It is the purpose of this invention to so construct a culinary knife that it may not only be adapted to the paring of vegetables, fruit, etc., with a gage to regulate the thickness of the paring, but also that the paring may be done by either the right or the left hand and furthermore that the device used to regulate the thickness of the paring may be physically removed from the knife so that its blade may be used as the blades of ordinary culinary knives are used, free from the paring attachment, thus materially enlarging the usefulness of the structure.

In the drawings Figure 1 is an elevation of a knife showing the invention as adapted to be used by the right hand; Fig. 2 is a view similar to Fig. 1, the handle being broken away, and the knife being adapted to use by the left-hand; Fig. 3 is a view similar to Fig. 1 of a modified construction and adapted to be used by the right hand; Fig. 4 is a view of the construction shown in Fig. 3 but adapted to use with the left hand; Fig. 5 is a cross-sectional view on the line 5—5 of Fig. 1 looking in the direction of the arrow; Fig. 6 is a cross-sectional view on the line 6—6 of Fig. 3 looking in the direction of the arrow.

In the drawings 1 represents the handle, 2 the blade. The paring attachment is composed of a flat piece of steel 3 provided with a pair of headed rivets 4 which are offset from the part 3 sufficiently to accommodate the blade 2. The forward edge of the part 3 is curved outwardly as at 5 and there is a wide open slot 6 made in it through which the parings pass during the use of the knife in a manner well understood. The knife blade is provided with a pair of perforations 7 having an enlarged part and a reduced or neck part as shown. The enlarged parts are adapted to permit the heads of the rivets 4 to pass through them and the reduced parts are adapted to receive the shank of the rivets.

The operation of the form of the invention thus far described is as follows: To pare vegetables or fruit with the right hand the parts are assembled as shown in Fig. 1, in which case the knife is held in the right hand, the vegetable or fruit in the left and the paring is performed in the usual manner, during which the cutting edge of the blade separates the paring from the article, which paring passes upwardly through the wide open slot 6 and the thickness of the paring is regulated by the presence of the paring attachment 3, the outwardly turned edge 5 whereof enables it to pass smoothly over the article being pared.

If it is desired to use the knife with the left hand then the paring attachment 3 is disengaged from the knife blade by so moving it that the heads of the rivets may pass through the enlarged openings 7 in the knife blade, whereby the knife being given a half turn in the hand so that its edge is presented to the right as in Fig. 2 instead of to the left as in Fig. 1, then upon readjusting the paring attachment upon the blade by a reversal of the operations just described, the parts will be assembled as shown in Fig. 2 in which case it will be adapted to use with the left hand.

If desired the paring attachment may be detached from the blade and laid aside, whereupon the knife will be left in the condition of an ordinary culinary knife except that the two holes referred to will be made through it, which, however, will in no wise interfere with its operations.

In Figs. 3, 4 and 6 I show a modified construction. In them 1 represents the handle and 2 the blade as before. In this instance, however, the blade has an enlarged or riblike back which may be made in any preferred manner. A convenient way is to roll the metal upon itself as shown at 8 (see Fig. 6) and the paring attachment is made by folding a piece of flat steel 9 upon itself so as to form, as it were, at or near its ends two eyes 10, 10, each eye having a projecting part 11 parallel with the main part 9 so that the blade 2 will be inclosed between the parts 9 and 11. The outer edge of this attachment seen at 12 is curved outwardly the same as the edge 5 in the other form.

The operation is obvious. When the utensil is to be used with the right hand the parts are assembled as shown in Fig. 3 and when it is desired to use it with the left hand the paring attachment is slipped off the blade, the blade is given a half turn so that its cutting edge will be presented to the right as shown in Fig. 4, instead of to the left as shown in Fig. 3, and the parts reengaged and when it is desired to use the knife for ordinary purposes, the paring attachment will be separated from the blade and temporarily set aside.

I wish it understood that the two constructions illustrated and described are by no means the only ones in which the invention may be embodied but I have found them useful and hence desirable. I therefore do not limit myself to the constructions shown and described.

I claim:

A culinary knife the blade whereof is enlarged at its back and having a paring attachment provided with projecting portions bent to form eyes adapted to engage with the enlarged back of the blade and to rest against it on the side opposite that against which the paring attachment rests.

In testimony whereof I have signed my name to this specification in the presence of two subscribing witnesses.

GEORGE A. MEYER.

Witnesses:
F. M. DOUSHACH,
EDWIN F. VALENTINE.

Copies of this patent may be obtained for five cents each, by addressing the "Commissioner of Patents, Washington, D. C."